Patented Dec. 1, 1931

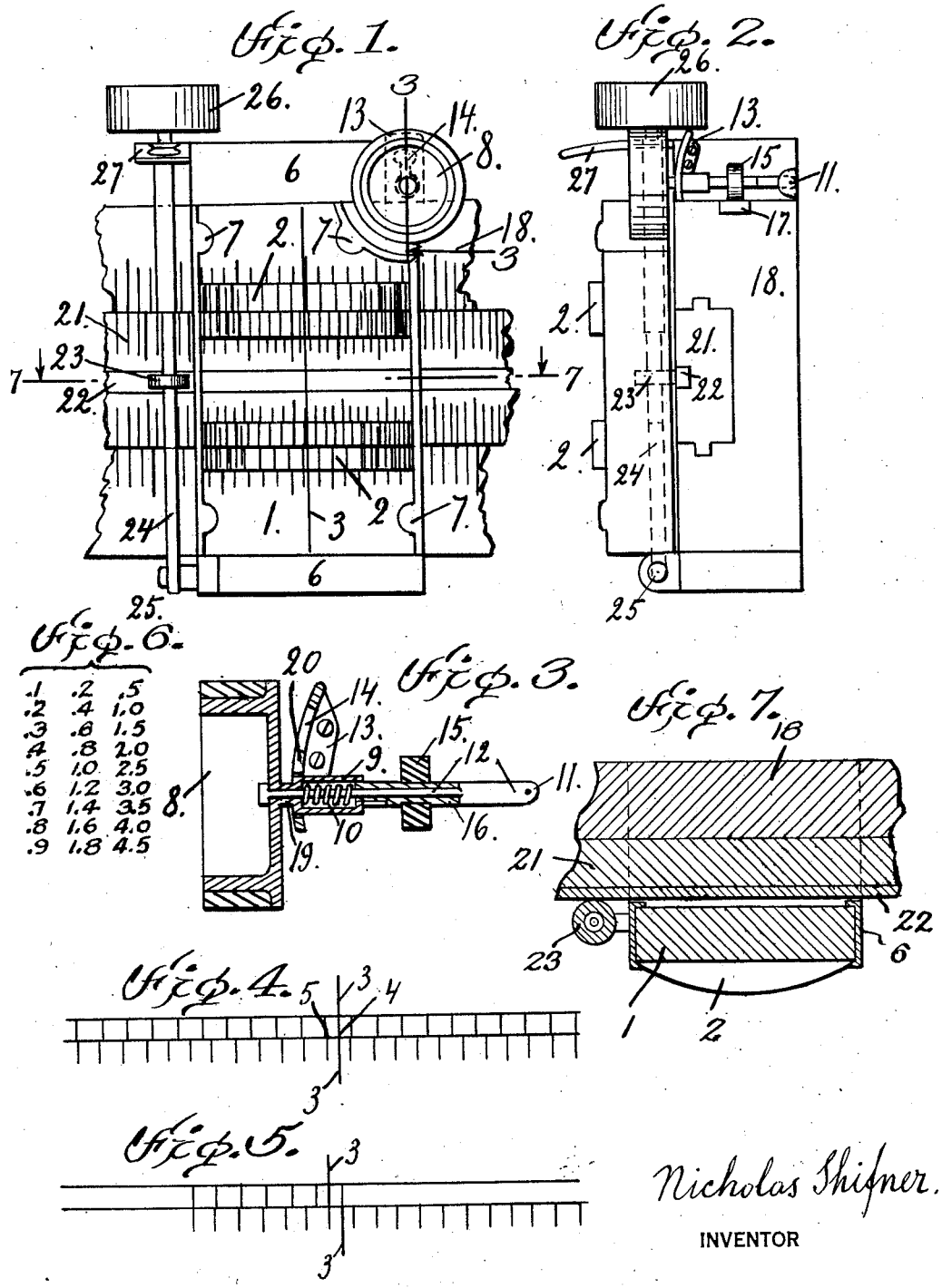

1,834,745

UNITED STATES PATENT OFFICE

NICHOLAS SHIFNER, OF NEW YORK, N. Y.

SLIDE RULE

Application filed March 10, 1930. Serial No. 434,599.

My invention relates to improvements in slide rules having logarithmic scales, logarithm of logarithms, reciprocal, and other scales in which the units in the different parts of scales are of different lengths.

The objects of my invention are, first, to increase the accuracy of the readings by means of an optical vernier of special construction; and second, to afford facilities for slight movements of each rule relatively to the optical vernier, and one to the other, which will permit more exact work and increase the accuracy of the computations.

The drawings illustrate the preferred form of the invention, in which

Figure 1 is a plan view of a portion of a slide rule with my improved optical vernier mounted thereon.

Fig. 2 is an end elevation thereof.

Fig. 3 is a sectional view taken on the line 3—3 of Fig. 1 to show the details of construction of the device for making small changes in the position of the vernier relatively to the exterior rule.

Fig. 4 is a schematic drawing representing a scale as it is seen through the optical vernier, the upper portion being magnified in the ratio of 11/10, while the lower portion is unchanged.

Fig. 5 is a similar view of the same scale as it would appear if seen on the rule from a side so that the magnified image is shifted to the left.

Fig. 6 is a table giving the value of decimals of a division of the logarithmic scales; this table ordinarily being printed on the rear face of the slide rule.

Fig. 7 is a sectional view taken on line 7—7 of Fig. 1.

The invention embodies a pair of rules 18 and 21, the former being termed the exterior rule, said rules being provided with rubber strips 17 and 22, respectively, set along the whole length of both rules. Said rules 18 and 21 are in slidable relation and bear the usual markings or graduations common to slide rules. As will presently be pointed out in detail, it is proposed to provide a novel optical vernier, the latter being associated with certain mechanisms for making slight changes in the positions of the rules relatively to that of said vernier.

As shown in Figs. 1 and 7, said optical vernier comprises a flat glass plate 1 having magnifying cylindrical sections 2 mounted thereon, said sections being arranged in juxtaposed relation and overlying a portion of the scales on said rules 18 and 21, while the other portion of the scales are seen, unmagnified, through the plain glass plate 1. In view of this arrangement the operator of the instrument sees the scale twice; once of unchanged or unmagnified size through the glass 1 and second, magnified in the ratio of 11 to 10 through the magnifying or cylindrical sections 2, so that the second image may serve as a vernier to the first if looked upon at an angle, so that one image is shifted relatively to the other as shown in Fig. 5. In Figs. 4 and 5 the upper portion schematically represents the image magnified in the ratio of 11 to 10, and the lower portion is unchanged.

The optical vernier is provided with a hair line 3 which enables the operator to accurately read the location of said line on a scale. Assuming that said hair line is projected on a scale, as shown in Fig. 4 and it is desired to ascertain what part of a division the section 4—5 is, the rule is viewed from the side and the inclination of the rule is adjusted so as to bring the nearest mark of a magnified division to coincide with the hair line seen through the plain glass 1. From this division mark the operator counts how many spaces it takes to the nearest magnified division mark which coincides with one of the normal unmagnified division marks. This gives the decimal of the division, (0.6 in the example shown in the drawings). The value of this decimal varies with the location of the division on the slide rule since the value of the divisions themselves changes with the location. The value of this decimal of a division of the logarithmic scale of the rule can readily be obtained from the table shown in Fig. 6, said table ordinarily being placed on the rear of the rule for convenience. The table is based on the following. The value of a division of the log scale is changed twice. In the first part of the scale the value is expressed in tenths; in the following part the value is 0.2, and in the last column the value is 0.5. For instance, if the decimal 6, as illustrated in Fig. 5, is located on the first part of the scale, would signify 6×0.1=0.6; if located on the second part of the scale would signify 6×0.2=1.2; and if located on the third part of the scale would signify 6×0.5=3.0.

As shown in Fig. 1 said optical vernier is mounted in a frame 6 where it is fastened by means of clamps 7. Since this slide rule permits more accurate readings, said frame is operatively associated with a pair of devices for making slight changes of each of the rules 18 and 22 relative to the vernier. One of these devices is clearly shown in Fig. 3, wherein it will be observed that the drum 8 is provided with a bored casing 9 for the reception of a spring 10, the latter encircling the stem 12. A plate 13, carried by the frame 6 is provided with interconnecting apertures 14 and as shown in said Fig. 3 the upper portion of said casing 9 is positioned in the lower aperture 14 when the rubber wheel 15 contacts the strip 17, (see Fig. 2). Obviously, the spring 10 maintains the drum and casing in the position just described and so long as no pressure is applied to the drum in the direction of the pivot 11, of the stem 12, the casing remains in said position. Rotating said drum 8 revolves said wheel 15, thus sliding the optical vernier along the rule 18. In the event it is desired to quickly change the positions of the rule, the drum 8 is pressed inwardly thus removing the upper portion of the casing from the lower aperture 14 and permitting the passage of the neck 19 through the slot 20 to the upper aperture 14 and upon releasing the pressure said casing enters the said aperture. It will be understood that the device oscillates on the pivot 11 during the above described movement.

For slight changes in the relative positions of the vernier and the rule 21, the drum 26 is rotated to revolve the rubber wheel 23 mounted on the stem 24, said wheel engaging the rubber strip 22 and effecting the desired movement.

Upon inspection of Fig. 1 it will be noted that the stem 24 is carried by the frame 6, one end of said stem being pivoted to said frame, as indicated at 25, and the other end being mounted in plate 27.

From the foregoing description, taken in connection with the drawings, the advantages of my invention will be readily apparent, and while I have described the principle and operation of the invention, together with the device which I now consider to be the embodiment thereof, I desire to have it understood that right is reserved to make such changes that may fall within the spirit of the invention and the scope of the appended claims.

I claim:

1. An optical vernier for a slide rule of the kind including a magnifying portion overlying a portion of the scale of the rule to produce an image of the rule, said image and the exposed portion of said rule being used as a vernier for each other.

2. An optical vernier for a slide rule of the kind including magnifying and non-magnifying portions overlying the scale of the rule to produce two different images of said scale, one of which is used as a vernier of the other.

3. In a slide rule, a sliding frame carrying a group of glasses, said glasses being constructed to produce two different images of the scales, one of which is used as a vernier for the other.

4. In a slide rule, an optical vernier, a frame supporting said vernier, a telescopic stem pivotally borne by said frame, rotatable means frictionally contacting said rule to permit movement of said vernier relative to said rule, a plate having interconnecting apertures carried by said frame and means permitting depression of said stem whereby said rotatable means may be optionally oscillated from contact with said rule to allow for quick changes in the relative positions of said rule and vernier.

5. An optical vernier for a slide rule of the kind including a refracting portion overlying a portion of the scale of the rule to produce an image of said rule, said image and the exposed portion of said rule being used as a vernier for each other.

6. In a slide rule, a sliding glass of the shape constructed to produce two different images of the scales, one of which is used as a vernier for the other.

NICHOLAS SHIFNER.